US010280248B2

(12) United States Patent
Feng et al.

(10) Patent No.: US 10,280,248 B2
(45) Date of Patent: May 7, 2019

(54) POLYURETHANE SEALANT

(71) Applicant: BASF SE, Ludwigshafen (DE)

(72) Inventors: Yue Xia Feng, Shanghai (CN); Cheun Gwo Chen, Shanghai Baoshan District (CN); Andreas Emge, Lemfoerde (DE); Jia Liang Di, Shanghai Baoshan District (CN)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/035,000

(22) PCT Filed: Nov. 7, 2014

(86) PCT No.: PCT/EP2014/074033
§ 371 (c)(1),
(2) Date: May 6, 2016

(87) PCT Pub. No.: WO2015/067749
PCT Pub. Date: May 14, 2015

(65) Prior Publication Data
US 2016/0280837 A1    Sep. 29, 2016

(30) Foreign Application Priority Data

Nov. 8, 2013 (WO) ................ PCT/CN2013/086754

(51) Int. Cl.
| C08G 18/08 | (2006.01) |
| C08G 18/50 | (2006.01) |
| C08G 18/63 | (2006.01) |
| C08G 18/12 | (2006.01) |
| C08G 18/40 | (2006.01) |
| C08G 18/48 | (2006.01) |
| C08G 101/00 | (2006.01) |

(52) U.S. Cl.
CPC ............ *C08G 18/14* (2013.01); *C08G 18/12* (2013.01); *C08G 18/4072* (2013.01); *C08G 18/482* (2013.01); *C08G 18/4812* (2013.01); *C08G 18/5021* (2013.01); *C08G 18/632* (2013.01); *C08G 2101/0066* (2013.01); *C08G 2101/0083* (2013.01); *C08G 2190/00* (2013.01)

(58) Field of Classification Search
CPC .... C08G 18/12; C08G 18/14; C08G 18/4009; C08G 18/4072; C08G 18/4812; C08G 18/482; C08G 18/5021; C08G 18/632; C08G 2101/0066; C08G 2101/0083; C08G 2190/00
See application file for complete search history.

(56) References Cited

U.S. PATENT DOCUMENTS

| 3,304,273 | A | 2/1967 | Stamberger |
| 3,383,351 | A | 5/1968 | Stamberger |
| 3,523,093 | A | 8/1970 | Stamberger |
| 3,979,364 | A | 9/1976 | Rowton |
| 4,045,527 | A | 8/1977 | Babayan et al. |
| 5,688,860 | A | 11/1997 | Croft |
| 5,810,956 | A | 9/1998 | Tanis et al. |
| 2002/0040069 | A1 | 4/2002 | Yokota et al. |
| 2003/0087980 | A1 | 5/2003 | Moriga et al. |
| 2004/0176492 | A1 | 9/2004 | Brown |
| 2004/0209970 | A1 | 10/2004 | Moriga et al. |
| 2011/0168217 | A1* | 7/2011 | Neff ................. C08G 18/10 134/201 |
| 2012/0238656 | A1* | 9/2012 | De Kesel ............ C08J 9/0061 521/137 |
| 2012/0289619 | A1* | 11/2012 | Battistini .......... C08G 18/4072 521/125 |

FOREIGN PATENT DOCUMENTS

| DE | 111394 | 7/1900 |
| DE | 1 152 536 | 8/1963 |
| DE | 1 152 537 | 8/1963 |
| DE | 44 11 984 A1 | 10/1995 |
| EP | 0 250 351 A2 | 12/1987 |
| EP | 0 540 950 A2 | 5/1993 |
| EP | 1 182 220 A1 | 2/2002 |
| EP | 1 308 396 A2 | 5/2003 |
| WO | WO 94/00504 A1 | 1/1994 |
| WO | WO 2005/098763 A2 | 10/2005 |

OTHER PUBLICATIONS

International Search Report and Written Opinion dated Feb. 6, 2015 in PCT/EP2014/074033.

* cited by examiner

*Primary Examiner* — John M Cooney
(74) *Attorney, Agent, or Firm* — Oblon, McClelland, Maier & Neustadt, L.L.P.

(57) ABSTRACT

The present invention relates to a process for producing a polyurethane sealant, which comprises mixing (a) polyisocyanate, (b) polyetherpolyols, (c) aliphatic, exclusively amine initiated alkoxylation products having an OH-number of 400 to 1000 mg KOH/g and a functionality of 4, (d) blowing agents and optionally (e) chain extenders and/or crosslinking agents, (f) catalysts and (g) auxiliaries and/or additives to give a reaction mixture and reacting the reaction mixture to give the polyurethane sealant. The present invention further relates to a cast in place polyurethane sealant, obtained according to a process according to the present invention.

11 Claims, No Drawings

POLYURETHANE SEALANT

The present invention relates to a process for producing a foamed polyurethane sealant, which comprises mixing (a) polyisocyanate, (b) polyetherpolyols, (c) aliphatic, exclusively amine initiated alkoxylation products having an OH-number of 400 to 1000 mg KOH/g and a functionality of 4, (d) blowing agents and optionally (e) chain extenders and/or crosslinking agents, (f) catalysts and (g) auxiliaries and/or additives to give a reaction mixture and reacting the reaction mixture to give the polyurethane sealant. The present invention further relates to a polyurethane sealant, obtained according to a process according to the present invention.

Polyurethane based sealants are well known. So EP540950 discloses a moisture-curable urethane based sealant made upon a urethane prepolymer and a polyurethane compound. U.S. Pat. No. 3,979,364 discloses the application of amine terminated polyether in the polyol component of a two component polyurethane composition for the production of surface coatings, caulks and sealants and the effect of the amine terminated polyether polyol as thickening agent for the reaction mixture obtained by mixing the polyol and the isocyanate component.

U.S. Pat. No. 5,810,956 discloses a non-foaming, thixotropic two-component polyurethane elastomeric material and its use as cast in place sealant. According to U.S. Pat. No. 5,810,956 the isocyanate reactive component comprises polyether polyols. Among polyether polyols aliphatic or aromatic amine initiated, polypropylene oxide extended polyols are mentioned. As thixotropic filler fumed silica is mentioned. In the examples Mutranol 29138 is used as amine initiated polyol which is an amine based polyethertriol.

It was object of the present invention to provide a foamed polyurethane based sealant, preferably a cast in place sealant, having a long open time, and cures quickly. Further it was object of the present invention to provide a foamed sealant having good mechanical properties as a low compression set and a high tear strength at a low shore A hardness.

The object is achieved via a foamed polyurethane sealant obtainable via mixing (a) polyisocyanate, (b) polyetherpolyols, (c) aliphatic, exclusively amine initiated alkoxylation products having an OH-number of 400 to 1000 mg KOH/g and a functionality of 4, (d) blowing agents and optionally (e) chain extenders and/or crosslinking agents, and (f) auxiliaries and/or additives to give a reaction mixture and reacting the reaction mixture to give the polyurethane sealant.

The foamed polyurethane sealing according to the present invention preferably is a cast in place sealant. According to the present invention the term "cast in place sealant" is defined as sealant which is obtained by casting a reaction mixture directly onto the carrier where the sealant is to be used and curing the reaction mixture to form the sealant. Sealants produced in a different place, e.g. in a mould and which are transferred to the carrier where they are to be used as sealant after reaction of the reaction mixture to give the polyurethane sealant for example by gluing the sealant onto a carrier do not fall under the definition of a cast in place sealant.

As carrier material to produce a cast in place sealant all kind of material can be used. Usually the cast in place sealant is used to seal doors, for example of electrical devices as distribution boxes or fuse boxes. Therefore preferably all material conventially used to produce the outer case and especially the doors of these devices can be used as carrier material. This encompasses metal as steel, aluminum, coated metal as painted metal and plastics as coated or uncoated fiber reinforces epoxy resins or thermoplastic resins.

The average density of the polyurethane sealant according to the present invention is preferably from 80 to 600 g/liter, particularly preferably from 100 to 400 g/liter, and in particular from 150 to 300 g/liter.

The polyisocyanates (a) used to produce the cast in place sealant according to the invention comprise the aliphatic, cycloaliphatic, and aromatic di- or polyfunctional isocyanates as known in polyurethane chemistry, and also any desired mixture thereof. Examples are members of the methandiphenyldiisocyanate-family (MDI-family) as methanediphenyl 4,4'-diisocyanate (4,4'-MDI), methanediphenyl 2,4'-diisocyanate (2,-4'-MDI), (methanediphenyl 4,4'-diisocyanate and methanediphenyl 2,4'-diisocyanate are also referred to as monomeric MDI), homologues of methanediphenyl diisocyanate having a greater number of rings (polymer MDI) and modified MDI as carbodiimide modified MDI and biuret modified MDI, tetramethylene diisocyanate, hexamethylene diisocyanate (HDI), isophorone diisocyanate (IPDI), tolylene 2,4- or 2,6-diisocyanate (TDI), and mixtures of the isocyanates mentioned.

It is preferable to use members of the MDI-family, especially mixtures of monomeric MDI and polymeric MDI. The preferably used members of the MDI family comprise in a preferred object of the present invention of up to about 20% by weight, based on the total weight of the MDI, of allophanate- or uretonimine-modified MDI.

Polyisocyanate component (a) is preferably used in the form of polyisocyanate prepolymers. Said polyisocyanate prepolymers are obtainable by reacting polyisocyanate as described above (a-1) in stoichiometric excess with polyols (a-2) and optionally chain extenders and/or cross linkers (a-3), to give the isocyanate terminated prepolymer, for example at temperatures of from 30 to 100° C., preferably from about 80° C.

Polyols (a-2) are known to the person skilled in the art and are described by way of example in "Kunststoffhandbuch, Band 7, Polyurethane" [Polyurethane Handbook, Carl Hanser Verlag, 2nd edition 1993, chapter 3.1]. It is preferable here to use, as polyols (a-2), polyetherols as described in (b), especially polyetherols containing propyleneoxide, more preferred polypropyleneoxide.

Conventional chain extenders or crosslinking agents (a-3) are optionally added to the polyols (a-2) for the production of the isocyanate prepolymers. These substances are described under (c) below.

The isocyanate content of the isocyanate terminates prepolymer is preferably in the range of 5 to 45% by weight, more preferred 15 to 30 and most preferred 20 to 28% by weight.

Polyetherols (b) usually have a molecular weight of at least 500 g/mol. Polyetherols (c) are produced by known processes, for example by anionic polymerization using alkali metal hydroxides or alkali metal alcoholates as catalysts, and with addition of at least one starter molecule which comprises from 2 to 3 reactive hydrogen atoms, or by cationic polymerization using Lewis acids, such as antimony pentachloride or boron fluoride etherate, from one or more alkylene oxides having from 2 to 4 carbon atoms in the alkylene moiety. Examples of suitable alkylene oxides are tetrahydrofuran, propylene 1,3-oxide, butylene 1,2- or 2,3-oxide, and preferably ethylene oxide and propylene 1,2-oxide. Other catalysts that can be used are multimetal cyanide compounds, known as DMC catalysts. The alkylene oxides can be used alone, in alternating succession, or in the form of a mixture. Preference is given to use of mixtures of propylene 1,2-oxide and ethylene oxide, where amounts of from 5 to 50%, based on the total amount of alkylene oxides, of the ethylene oxide are used as ethylene oxide end block ("EO cap"), so that the resultant polyols have more than 70% of primary OH end groups.

A starter molecule that can be used is water or di- or trihydric alcohols, such as ethylene glycol, 1,2- or 1,3-propanediol, diethylene glycol, dipropylene glycol, 1,4-butanediol, glycerol, or trimethylolpropane. In another embodiment molecules having primary and secondary amine functionalities can be used as starter material in case that the resulting polyethers do not fall under the definition of compound (c), i.e. the functionality is 2, 3 or 5 or higher and/or the OH number is less than 400.

Other suitable polyols are polymer-modified polyetherols, particularly preferably graft polyetherols. Such polymer modified polyetherols are also known as polymer polyetherol. Polymer polyetherols usually have from 5 to 60% by weight content of preferably thermoplastic polymers, preferably from 10 to 55% by weight, particularly preferably from 30 to 55% by weight, and in particular from 40 to 50% by weight. These polymer polyesterols are described by way of example in WO 05/098763 and EP-A-250 351, and are usually produced via free-radical polymerization of suitable olefinic monomers, such as styrene, acrylonitrile, (meth)acrylates, (meth)acrylic acid, and/or acrylamide, in a polyetherol serving as graft base. The side chains are generally produced via transfer of the free radicals from growing polymer chains onto polyesterols or polyetherols. The polymer polyetherol comprises, alongside the graft copolymers, mainly the homopolymers of the olefins, dispersed in unaltered polyetherol.

In one preferred embodiment, the monomers used comprise acrylonitrile, or styrene, preferably acrylonitrile and styrene. The monomers are optionally polymerized in the presence of further monomers, of a macromer, i.e. of an unsaturated polyol capable of free-radical polymerization, and of a moderator, and with use of a free-radical initiator, mostly azo compounds or peroxide compounds, in a polyesterol or polyetherol as continuous phase. This process is described by way of example in DE 111 394, U.S. Pat. No. 3,304,273, U.S. Pat. No. 3,383,351, U.S. Pat. No. 3,523,093, DE 1 152 536, and DE 1 152 537.

During the free-radical polymerization reaction, the macromers are concomitantly incorporated into the copolymer chain. This gives block copolymers having a polyester block or, respectively, polyether block and a polyacrylonitrile-styrene block; these act as compatibilizers at the interface between continuous phase and disperse phase, and suppress agglomeration of the polymer polyesterol particles. The proportion of the macromers is usually from 1 to 20% by weight, based on the total weight of the monomers used to produce the polymer polyol.

If the material comprises polymer polyetherol, this is preferably present together with further polyetherols. The proportion of polymer polyol is particularly preferably greater than 5% by weight, based on the total weight of component (b). The amount of the polymer polyetherols comprised can by way of example, based on the total weight of component (b), be from 7 to 90% by weight, or from 11 to 80% by weight.

The average functionality of the polyether polyols (b), is preferably from 2.0 to 3.5, more preferred 2.5 to 3.0 and an average hydroxyl number is from 20 to 160 mg KOH/g, more preferred 25 to 90 mg KOH/g and most preferred 30 to 80 mg KOH/g.

As compound (c) an aliphatic, exclusively amine initiated alkoxylation products having an OH-number of 400 to 1000 mg KOH/g, preferably 450 to 900 mg KOH/g and more preferably 500 to 800 mg KOH/g. The OH-functionality of the alkoxylated amine (c) is 4. Alkoxylated amines (c) are usually produced by alkoxylation of diamines by a known method. Preferably diamines as ethylenediamine, propylendiamine, butylendiamine, pentylendiamine, hexylendiamine; isophorondiamine, hexamethylenediamine (HAD) and hydrogenated methylenediphenylenediamine (H12MDA), most preferably ethylenediamine is used as amine starter. As alkylene oxides one or more alkylene oxides having from 2 to 4 carbon atoms in the alkylene moiety can be used. Examples of suitable alkylene oxides are tetrahydrofuran, propylene 1,3-oxide, butylene 1,2- or 2,3-oxide, and preferably ethylene oxide and propylene 1,2-oxide. In an especially preferred embodiment only propylene 1,2-oxide is used as alkoxylation agent.

The content of the aliphatic amine initiated alcoxylation product (c) is preferably 0.1 to 10 wt.-%, more preferably 0.5 to 6 wt.-% and most preferably 1.0 to 4.0) wt.-%, based on the total weight of the components (a) to (f).

Blowing agents (d) are also present during the production of polyurethane foams. Said blowing agents (d) preferably comprise water. Blowing agents (d) that can be used comprise well-known compounds having chemical and/or physical effect or mixtures of these blowing agents. Chemical blowing agents are compounds which use reaction with isocyanate to form gaseous products, an example being water or formic acid. Physical blowing agents are compounds which have been emulsified or dissolved in the starting materials for polyurethane production and which vaporize under the conditions of polyurethane formation. By way of example, these involve hydrocarbons, halogenated hydrocarbons, and other compounds, for example perfluorinated alkanes, such as perfluorohexane, chlorofluorocarbons, and ethers, esters, ketones, acetals, and mixtures thereof, for example cyclo)aliphatic hydrocarbons having from 4 to 8 carbon atoms, or fluorocarbons, such as Solkane® 365 mfc from Solvay Fluorides LLC. A preferred embodiment uses, as blowing agent, a mixture comprising at least one of said blowing agents and water, and in particular water as sole blowing agent.

In one preferred embodiment, the content of water is from 0.1 to 2% by weight, preferably from 0.2 to 1.5% by weight, particularly preferably from 0.3 to 1.2% by weight, in particular from 0.4 to 1% by weight, based on the total weight of components (a) to (g).

Chain extenders and/or crosslinking agents (e) used comprise substances with a molar weight that is preferably smaller than 500 g/mol, particularly preferably from 60 to 400 g/mol, more preferably from 60 to 250 g/mol, where chain extenders have 2 hydrogen atoms reactive toward isocyanates and crosslinking agents have 3 hydrogen atoms reactive toward isocyanate. Chain extenders and/or crosslinking agents (e) do not comprise aliphatic, exclusively amine initiated alkoxylation products having an OH-number of 400 to 1000 mg KOH/g and a functionality of 4 (c).

Chain extenders and/or crosslinking agents (e) can be used individually or preferably in the form of a mixture. It is preferable to use diols and/or triols with the molecular weights smaller than 400, particularly preferably from 60 to 300 and in particular from 60 to 150. Examples of chain extenders and crosslinking agents that can be used are aliphatic, cyclo)aliphatic, and/or araliphatic diols having from 2 to 14, preferably from 2 to 10, carbon atoms, for example ethylene glycol, 1,3-propanediol, 1,10-decanediol, 1,2-, 1,3-, 1,4-dihydroxycyclohexane, diethylene glycol, dipropylene glycol, and preferably 1,4-butanediol, 1,6-hexanediol, and bis(2-hydroxyethyl)hydroquinone, triols, such as 1,2,4- or 1,3,5-trihydroxycyclohexane, glycerol, and trimethylolpropane, and low-molecular-weight hydroxylated polyalkylene oxides based on ethylene oxide and/or based on propylene 1,2-oxide and on the abovementioned diols and/or triols as starter molecules. In one preferred example propoxylated trithanolamine can be used as chain extender. In this case also the amount of compound (c) applied can be lowered. Most preferably no chain extenders are used.

As catalysts (f) conventional catalysts as known in the field of production of polyurethanes can be applied. Mention may be made by way of example of amidines, such as 2,3-dimethyl-3,4,5,6-tetrahydropyrimidine, tertiary amines, such as triethylamine, tributylamine, dimethylbenzylamine, N-methyl-, N-ethyl-, and N-cyclohexylmorpholine, N,N,N', N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds, such as triethanolamine, triisopropanolamine, N-methyl- and N-ethyldiethanolamine, and dimethylethanolamine. It is also possible to use organometallic compounds, preferably organotin compounds, such as tin(II) salts of organic carboxylic acids, e.g. tin(II) acetate, tin(II) octoate, tin(II) ethylhexoate, and tin(II) laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. Preferably exclusively amine catalysts are used.

Usually catalysts are applied in an amount of 0.01 to 2% by weight, preferably 0.1 to 1% by weight, each based on the total weight of components (a) to (f).

The auxiliaries and additives (g) comprise catalysts, surface-active substances, flame retardants, reinforcing materials, bonding agents, UV stabilizers, antioxidants, dyes, pigments and hydrolysis inhibitors and also fungistatic and bacteriostatic substances. The addition of additives to the amine component is limited by the need for a processable viscosity. Preferred additives are pigments, bonding agents, UV stabilizers, antioxidants and/or reinforcing materials. These substances are known in polyurethane and polyurea production.

For the purposes of the present invention, reinforcing materials are the conventional organic and inorganic reinforcing materials or fillers known per se having a particle diameter of usually greater than 10 µm, preferably from 50 µm to 50 mm. Here, the particle diameter is the longest axis. In the case of chopped glass fibers, for example, the "particle diameter" according to the present invention would be the length of the fibers. Specific examples which may be mentioned as fillers or reinforcing material are: inorganic fillers such as siliceous minerals, for example sheet silicates such as antigorite, bentonite, serpentine, hornblendes, amphiboles, chrysotile and talc, metal oxides such as kaolin, aluminum oxides, titanium oxides, zinc oxide and iron oxides, metal salts such as chalk and barite and inorganic pigments such as cadmium sulfide, zinc sulfide and also glass, etc. Preference is given to using kaolin (China Clay), aluminum silicate, fumed silica and copracipitates of barium sulfate and aluminum silicate and glass fibers, especially fumed silica. Examples of possible organic fillers are: carbon black, melamine, rosin, cyclopentadienyl resins and graft polymers and also cellulose fibers, polyamide, polyacrylonitrile, polyurethane, polyester fibers based on aromatic and/or aliphatic dicarboxylic acids and in particular carbon fibers. Most preferably used as filler is fumed silica.

The inorganic and organic reinforcing materials can be used individually or as mixtures and are advantageously added to the reaction mixture in amounts of from 0.5 to 50% by weight, preferably from 1 to 30% by weight, more preferably 1.5 to 15 by weight and especially 2 to 10% by weight, based on the weight of the components (a) to (e).

To prepare the polyurethane sealant of the invention, the components (a) to (e) are preferably mixed at temperatures of from 10 to 90° C., particularly preferably from 15 to 70° C. and in particular from 20 to 50° C. In a preferred embodiment components (b) to (f) are premixed to form the so called polyol component. This mixture is then preferably applied to a carrier material as defined above and cured to form the cast in place polyurethane sealant. Alternatively the reaction mixture is applied onto a material having release properties as a mould or a release paper, e.g. a Teflon paper and then cured. After curing the polyurethane sealant is the transferred from the release material to the final carrier and can be adhered to that final carrier for example by using an adhesive.

To prepare the polyurethane sealant of the invention the components (b) to (d) and, if present, (e) to (g) can also be mixed to form a polyol component which is then mixed with the isocyanate component (a).

The mixing ratios are selected so that the equivalence ratio of NCO groups of the polyisocyanates (a) to the sum of the reactive hydrocarbon atoms of the components (b) and optionally (c) and (d) is 0.5-1.1:1, preferably 0.6-0.9:1 and more preferably 0.6 to 0.8:1. A ratio of 1:1 corresponds to an isocyanate index of 100.

For the purposes of the invention, the mixture of the components (a) to (d) and if present (e) to (g) at reaction conversions of less than 90%, based on the isocyanate groups, will be referred to as reaction mixtures.

A further object of the present invention is a cast in place sealant obtainable according to a process of the present invention.

The polyurethane sealants according to the present invention show outstanding mechanical properties as a low compression set, a high tensile strength, a high tear strength and a good elongation at low shore hardness of preferably less than 23 shore A, more preferably less than 20 shore A and especially preferred less than 10 shore A.

Further the sealant can be easily obtained and shows good reaction properties as a long open time and a short cream time allowing fast curing after application. The obtained sealant further shows fine and uniform foam cells and a very smooth surface and good haptics.

The invention is illustrated below with the aid of examples.

EXAMPLES

The parameters of the present invention were determined according to the following standards:

The hydroxyl values were determined in accordance with DIN 53240.

The mechanical properties like tensile strength, elongation and tear strength were determined in accordance with DIN 53504

Compression set was determined at a compression of 40% at 70.C, according DIN EN ISO 1856

Cream time was determined in a cup test and is the time the reaction mixture starts to rise rapidly.

Tack free time was determined by touching the surface of the strip and corresponds to the time needed until the surface is found to be dry and smooth.

The following substances were used in the Example section:

Polyol 1: Polyetherol with OH number of 35 mg KOH/g and functionality 2.7, based on ethylene oxide and propylene oxide with glycerol as starting material Polyol 2: Graft polyol having 30 wt.-% solids content (styrene-acrylonitrile) in polyol 1 as carrier polyol Polyol 3: Polyetherol with OH number of 42 mg KOH/g and functionality 2.7, based on ethylene oxide and propylene oxide with glycerol as starting material Polyol 4: Polyetherol with OH number of 20 mg KOH/g and functionality 1.8, based on ethylene oxide and propylene oxide with propylenglycol as starting material Polyamine 1: Alkoxylation product of ethylenediamin and propyleneglycol having an OH number of 770 mg KOH/g Polyamine 2: Alkoxylation product of Toluenediamin and ethyleneglycol and propyleneglycol having an OH number of 380 mg KOH/g Polyamine 3: Alkoxylation product of triethanolamin and propyleneglycol having an OH number of 470 mg KOH/g Iso: MDI based prepolymer containing the reaction product of monomeric MDI, polymeric MDI and polyols 3 and 4, having an NCO content of 25.5% by weight.

Example 1 and comparative examples 1 to 3 are prepared using the ingredients as specified in table 1. Polyols, water, foam stabilizer, black paste and fumed silica are premixed to give a polyol component. The amounts of the respective ingredients are given in table in percent by weight. Polyol component and isocyanate are mixed at an isocyanate index of 62 and applied to a metal plate. After 24 hours at 25° C. and 50% relative humidity the mechanical properties were determined.

|  | Ex. 1 | Comp. 1 | Comp. 2 | Comp. 3 |
|---|---|---|---|---|
| Polyol 1 | 63.2 | 65 | 63.2 | 63.2 |
| Polyol 2 | 5.4 | 5.6 | 5.4 | 5.4 |
| Polyol 3 | 7.2 | 7.4 | 7.2 | 7.2 |
| Polyol 4 | 13.6 | 13.9 | 13.6 | 13.6 |
| Amin based katalyst | 0.5 | 0.5 | 0.5 | 0.5 |
| Polyamine 1 | 2.7 | 0 | 0 | 0 |
| Polyamine 2 | 0 | 0 | 2.7 | 0 |
| Polyamine 3 | 0 | 0 | 0 | 2.7 |
| Foam stabilizer | 1.8 | 1.9 | 1.8 | 1.8 |
| Water | 0.9 | 0.9 | 0.9 | 0.9 |
| Black paste | 0.2 | 0.2 | 0.2 | 0.2 |
| Fumed silica | 4.5 | 4.6 | 4.5 | 4.5 |
| Iso | Index 62 | Index 62 | Index 62 | Index 62 |
| Cream time | 60 | 60 | 58 | 60 |
| Tack free time | 15 | 63 | 30 | 31 |
| Compression set | 22.2 | 20.8 | 35.9 | 44.8 |
| Tensile strength | 183 | 137 | 155 | 151 |
| Elongation | 143 | 99 | 96 | 87 |
| Tear strength | 1.25 | 1.15 | 0.93 | 1.13 |
| Shore A | 8 | 10 | 7 | 7 |

It can be seen from the data above that the application of the alkoxylation product of an aliphatic amine according to the invention having an OH number of 770 and a functionality of 4 leads to faster curing, better mechanical properties as compression set, tensite strength, elongation and tear strength compared with the application of the alkoxylation product of an aromatic amine having an OH number of 380 and a functionality of 4 (comparative example 2) or an aliphatic amine having an OH value of 470 and a functionality of 3 (comparative examples 3). Compared to comparative example 1 without the application of a polyamine initiated polyol a much faster curing is obtained while compression set is only slightly higher. Surprisingly also mechanical properties like tensile strength, elongation and tear strength are also improved over comparative example 1.

The invention claimed is:

1. A process for producing a polyurethane cast in place sealant, comprising:
   mixing only
   a) polyisocyanate,
   b) polyetherpolyols,
   c) aliphatic, exclusively amine initiated alkoxylation products having an OH-number of 400 to 1000 mg KOH/g and a functionality of 4,
   d) blowing agents, and optionally
   e) chain extenders and/or crosslinking agents,
   f) catalysts, and
   g) auxiliaries and/or additives consisting of a surface-active substance, a flame retardant, a reinforcing material, a bonding agent, a UV stabilizer, an antioxidant, a dye, a pigment, a hydrolysis inhibitor, and/or a fungistatic and bacteriostatic substance
   to give a reaction mixture,
   applying the reaction mixture to a carrier, and
   reacting the reaction mixture to give the polyurethane cast in place sealant having a density of 80 to 600 g/liter,
   wherein
   the auxiliaries and/or additives (g), when present, has 2 to 10 wt %, based on a total weight of components (b) to (f), fumed silica as a reinforcing material,
   the polyetherpolyols (b) have an average functionality of 2.0 to 3.5 and an average hydroxyl number of 20 to 80,
   a content of the catalysts (f), when present, ranges from 0.1 to 1% by weight based on a total weight of components (a) to (f),
   in the reaction mixture, a ratio of NCO groups in the polyisocyanate (a) to a sum of isocyanate-reactive hydrogen atoms in the components (b) and optionally (c) and (d) is from 0.5:1 to 0.8:1,
   a content of the aliphatic amine initiated alkoxylation product (c) is 0.5 to 10 wt %, based on the total weight of the components (b) to (f), and
   the polyurethane cast in place sealant has a shore hardness of less than 20 shore A.

2. The process according to claim 1, wherein the aliphatic amine initiated alkoxylation product (c) is an alkoxylation product of ethylendiamine in the presence of an alkoxylation agent.

3. The process according to claim 2, wherein the alkoxylation agent is 1,2-propyleneoxide.

4. The process according to claim 1, wherein the density of the cast in place sealant is 100 to 400 g/liter.

5. The process according to claim 1, wherein the blowing agent comprises water.

6. The process according to claim 1, wherein components (a) to (e) are mixed at a temperature of form 15 to 70° C.

7. The process according to claim 1, wherein the polyetherpolyols (b) comprise polymer polyol.

8. The process according to claim 1, wherein the polyisocyanates (a) comprise a prepolymer obtained by reacting a stoichiometric excess of aromatic isocyanates with polyetherpolyols.

9. The process according to claim 1, wherein the carrier is at least one selected from the group consisting of a polymeric carrier, a metal carrier, and a painted metal carrier.

10. The process according to claim 1, wherein the carrier is a door.

11. A polyurethane cast in place sealant, obtained by the process according to claim 1.

* * * * *

UNITED STATES PATENT AND TRADEMARK OFFICE
CERTIFICATE OF CORRECTION

PATENT NO. : 10,280,248 B2
APPLICATION NO. : 15/035000
DATED : May 7, 2019
INVENTOR(S) : YueXia Feng et al.

Page 1 of 1

It is certified that error appears in the above-identified patent and that said Letters Patent is hereby corrected as shown below:

In the Specification

Column 1, Line 66, "conventially" should read -- conventionally --,

Column 4, Line 22, "alcoxylation" should read -- alkoxylation --,

Column 4, Line 24, "4.0)" should read -- 4.0 --,

Column 4, Line 41, "cyclo)aliphatic" should read -- cycloaliphatic --,

Column 5, Line 1, "cyclo)aliphatic," should read -- cycloaliphatic, --,

Column 5, Line 12, "trithanolamine" should read -- triethanolamine --,

Column 6, Line 4, "copracipitates" should read -- coprecipitates --,

Column 7, Line 31, "ethylenediamin" should read -- ethylenediamine --,

Column 7, Line 33, "Toluenediamin" should read -- toluenediamine --,

Column 7, Lines 56-57, "Amin based Katalyst" should read -- Amine based catalyst --, Column 8, Line 17, "tensite" should read -- tensile --, In the Claims Column 9, Line 3, Claim 2, "ethylendiamine" should read -- ethylenediamine --.

Signed and Sealed this
Seventeenth Day of March, 2020

Andrei Iancu
*Director of the United States Patent and Trademark Office*